United States Patent
Eusterbrock et al.

(10) Patent No.: US 7,294,977 B1
(45) Date of Patent: Nov. 13, 2007

(54) LAMP DIMMING SYSTEM AND METHODS

(75) Inventors: Paul Wilhelm Eusterbrock, Saint Paul, MN (US); Paul Rops, Holmen, WI (US); Mark Tellier, Browndeer, WI (US)

(73) Assignee: Holtkotter international, Inc., South St. Paul, MN (US)

( * ) Notice: Subject to any disclaimer, the term of this patent is extended or adjusted under 35 U.S.C. 154(b) by 0 days.

(21) Appl. No.: 11/331,594

(22) Filed: Jan. 13, 2006

(51) Int. Cl.
H05B 37/02 (2006.01)

(52) U.S. Cl. .................. 315/291; 315/362; 315/DIG. 4

(58) Field of Classification Search ................ 315/362, 315/127, 291, 360, DIG. 4; 307/139, 140, 307/144; 323/318
See application file for complete search history.

(56) References Cited

U.S. PATENT DOCUMENTS

| | | | | |
|---|---|---|---|---|
| 5,248,919 A | * | 9/1993 | Hanna et al. ................ | 315/291 |
| 5,854,519 A | * | 12/1998 | Gershen et al. ............. | 307/125 |
| 2006/0103331 A1 | * | 5/2006 | Johnson et al. ............. | 315/291 |
| 2006/0170364 A1 | * | 8/2006 | Yang ........................... | 315/59 |

* cited by examiner

*Primary Examiner*—Thuy Vinh Tran
(74) *Attorney, Agent, or Firm*—Merchant & Gould P.C.

(57) ABSTRACT

A system and related methods for operating a lamp. The system and method provide for ON/OFF control such that the light source illuminates in predefined steps and is reduced in predefined steps. Turning ON the light source may include powering the light source in one step from zero light to a first light level that is less than a maximum light level and powering the light source gradually over a first predetermined time period from the first light level to a second light level greater than the first light level. Turning OFF the light source may include powering the light source in one step from a third light level at or below the maximum light level to a fourth light level that is less than the third light level and powering the light source over a second predetermined time period from the fourth light level to zero light.

19 Claims, 5 Drawing Sheets

LAMP DIMMING SYSTEM AND METHODS

TECHNICAL FIELD

The present invention generally relates to lighting system and devices such as lamps, and more particularly relates to dimming systems and related methods of controlling light output from a lamp.

BACKGROUND

Controlling an electric light source is important in many applications (e.g., ON/OFF control and controlling the amount of light output). The way some light sources, such as floor lamps and wall and ceiling mounted light fixtures, are turned ON and OFF is cumbersome if there is no wall mounted ON/OFF switch. Sometimes wall mounted ON/OFF switches are not placed in ideal locations and can be placed far from the light source. The need for different amounts of light in different situations can be addresses by either exchanging the light source (e.g., light bulb) with different rated bulbs, or by controlling the amount of power allocated to the bulb. The first of these options has disadvantages of cost and time associated with maintaining a variety of bulbs and interchanging the bulbs. The second of these options, sometimes referred to as a dimming feature, can have many advantages.

A system that provides a variety of ON/OFF and dimming capabilities would be an advance in the art.

SUMMARY

One aspect of the present disclosure relates to a method of turning OFF a source of light generated by a lamp. The lamp includes a light source, a switch mounted on the lamp, and a controller or processor used to control power supply to the light source. The method includes engaging the switch, powering the light source in one step from a first light level to a second light level that is less than the first light level an amount discernable by a user, and powering the light source from the second light level to zero light. The method can also include delaying between when the second light level is reached and when powering of the light source from the second light level to zero light begins.

Another aspect of the present disclosure relates to a method of turning ON a source of light generated by a lamp. The lamp includes a light source, a switch, and a controller or processor used to control power supply to the light source. The method includes engaging the switch, powering the light source in one step from zero light to a first light level that is less than a maximum light level, and powering the light source from the first light level to a second light level greater than the first light level. The method can also include delaying between when the first light level is reached and when powering of the light source from the first light level to the second light level begins.

A further aspect of the present disclosure relates to a method of operating a lamp, wherein the lamp includes a light source, a switch mounted on the lamp, and a controller (processor) used to control power supply to the light source. One step of the method includes engaging the switch to turn ON the light source, wherein turning ON the light source includes powering the light source in one step from zero light to a maximum light level. Another step of the method includes engaging the switch to turn OFF the light source, wherein turning OFF the light source includes powering the light source in one step from a first light level at or below the maximum light level to a second light level that is less than the desired light level and powering the light source gradually over a second predetermined time period from the second light level to zero light.

A still further aspect of the present disclosure relates to a control circuit for use with a lamp. The control circuit includes a switch mounted to the lamp, a substrate positioned within the lamp, and a processor mounted to the substrate and configured to control illumination of the lamp according to a program run by the processor and in response to signals generated by activation of a lamp control switch. The control circuit also includes a plurality of filter components mounted to the substrate and configured to filter noise from the control circuit, wherein the plurality of filter components includes at least one fuse, a plurality of resistors, and a plurality of capacitors, and a triac mounted to the substrate and configured to control the power flow in response to control signals from the processor.

The above summary is not intended to describe each disclosed embodiment or every implementation of the inventive aspects disclosed herein. Figures in the detailed description that follow more particularly describe features that are examples of how certain inventive aspects may be practiced. While certain embodiments are illustrated and described, it will be appreciated that the invention/inventions of the disclosure are not limited to such embodiments.

While the inventive aspects of the present disclosure are amenable to various modifications and alternate forms, specific embodiments thereof have been shown by way of example in the drawings, and will be described in detail. It should be understood, however, that the intention is not to limit the inventive aspects to the particular embodiments described. On the contrary, the intention is to cover all modifications, equivalents, and alternatives falling within the spirit and scope of the inventive aspects.

DETAILED DESCRIPTION OF THE PREFERRED EMBODIMENT

Embodiments of the present invention will now be described more fully hereinafter with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention generally relates to lamps and light control systems and methods for use in lamps. The system and methods provide for ON/OFF control such that the light source illuminates in predefined steps and is reduced in predefined steps. Turning ON the light source may include powering the light source in one step from zero light to a first light level that is less than a maximum light level and powering the light source over a first predetermined time period from the first light level to a second light level. Turning OFF the light source may include powering the light source in one step from a third light level at or below the maximum light level to a fourth light level that is less than the third light level and powering the light source over a second predetermined time period from the fourth light level to zero light.

Figures 1, 2:
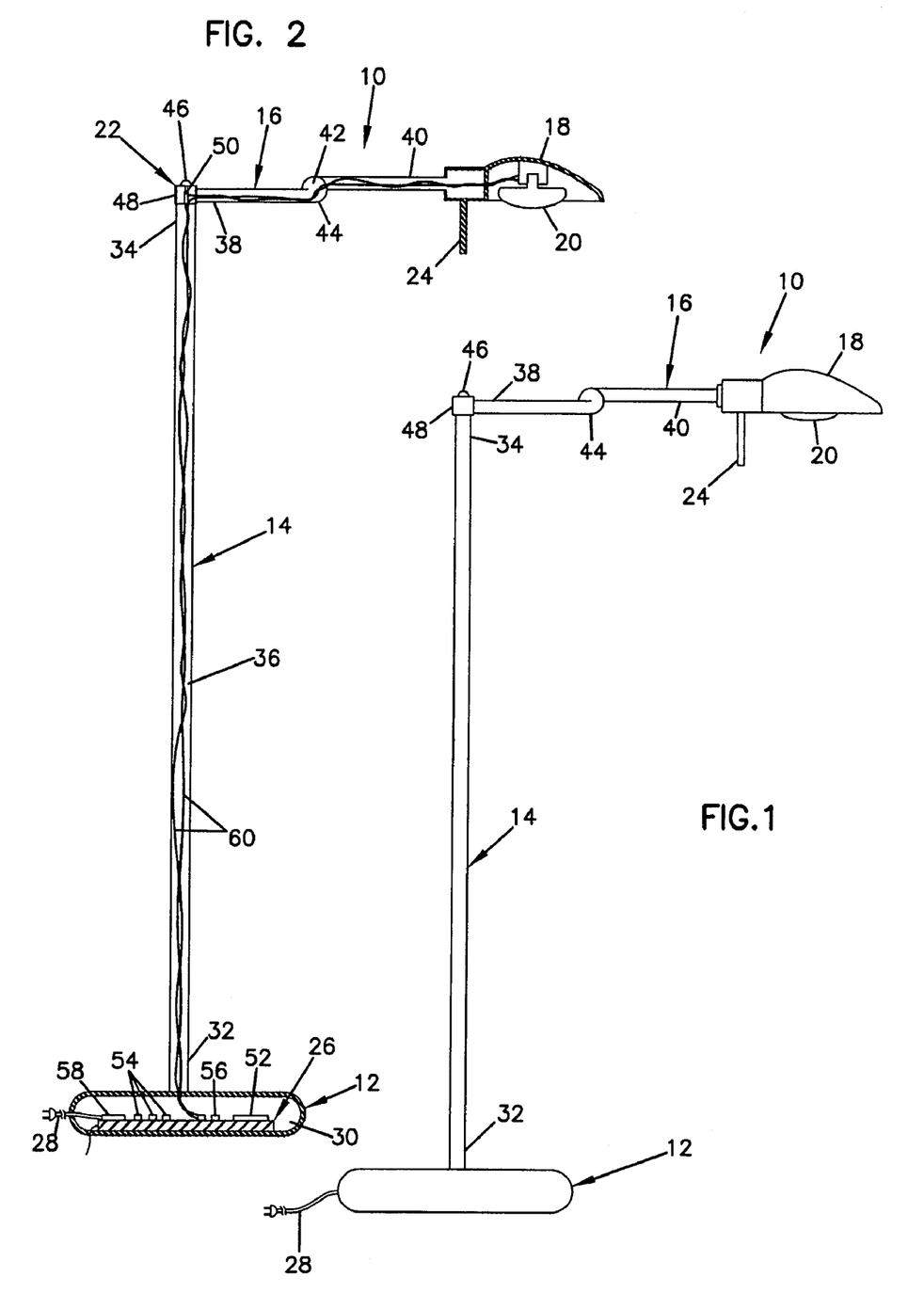
FIG. 1 is a side view of an example floor mounted lamp.
FIG. 2 is a cross-sectional view of the floor mounted lamp shown in FIG. 1 illustrating an example control system according to principles of the present invention.

Referring now to FIGS. 1 and 2, an example floor lamp 10 is shown and described. Lamp 10 includes a base 12, a stand 14 supported by the base 12, a support arm 16 supported by the stand 14, and a lamp shade 18 and a lamp bulb 20 supported by the swing arms 22, 24. The shape 18 with the bulb 20 can be positioned relative to the stand 14 by engaging a positioning arm 24. As used herein, the term "supported" is intended to include both direct and indirect connection or engagement of members in order to hold up or serve as a foundation of one member by another member.

The lamp 10 also includes a switch assembly 22 positioned at a junction between the stand 14 and the support arm 16. The structure and orientation of the switch assembly 32 at an upper end of the vertically upright lamp 10 shown in FIGS. 1 and 2 provides convenience and a simple user interface for the lamp. Other advantages to positioning a switch assembly along the length of the stand at a location vertically above the base are described in U.S. Pat. No. 6,877,885.

The lamp 10 also includes a circuit assembly 26 positioning within the lamp 10 inside the base 12. The circuit assembly 26 provides for control of light generation of the lamp 10 in response to signals received from the switch assembly 22. A power cord 28 is coupled to the circuit assembly 26 to provide power for illumination of the bulb 20 and operation of the circuit assembly 26.

The base 12 of the lamp 10 defines an interior space 30 that is sized to house at least a portion of the circuit assembly 26. Positioning the circuit assembly 26 within the base 12 provides concealment of the circuit components while maintaining the circuit assembly 26 in its entirety in close proximity to the switch assembly 22 and bulb 20.

The stand 14 and support arm 16 define hollow interiors 36, 42, respectively, sized to house a pair of wires 60 that extend from the circuit assembly 26 to the switch assembly 22 and bulb 20. The stand 14 has a first end 32 secured to the base 12 and a second end 34 secured to the support arm 16. The support arm 16 is secured at a first end 38 to the stand 14 and to the shade 18 at an opposed second end 40. The support arm 16 can include a joint 44 along its length that provides extension and retraction of the shade 18 and bulb 20 relative to the stand 14.

The stand 14 is shown in FIGS. 1 and 2 extending in a generally vertically orientation, and the support arm 16 is shown extending in a generally horizontal orientation that is perpendicular to the orientation of the stand 14. Other lamp styles are applicable and may include different configurations for the stand and support arm, such as configurations for wall and ceiling mounted light fixtures.

The switch assembly 22 includes an activation button 46, a housing 48, and a switch device 50. The activation button 46 protrudes out of the housing 48 and is exposed for engagement by a user to control light generation by the lamp. The switch device 50 is sized to fit within the housing 48. The switch assembly 22 defines the junction point between the stand 14 and support arm 16. In other embodiments, the switch assembly 22 may be positioned at an end point of the stand 14 or support arm 16 separate from the junction point between the stand 14 and support arm 16.

Figure 3:
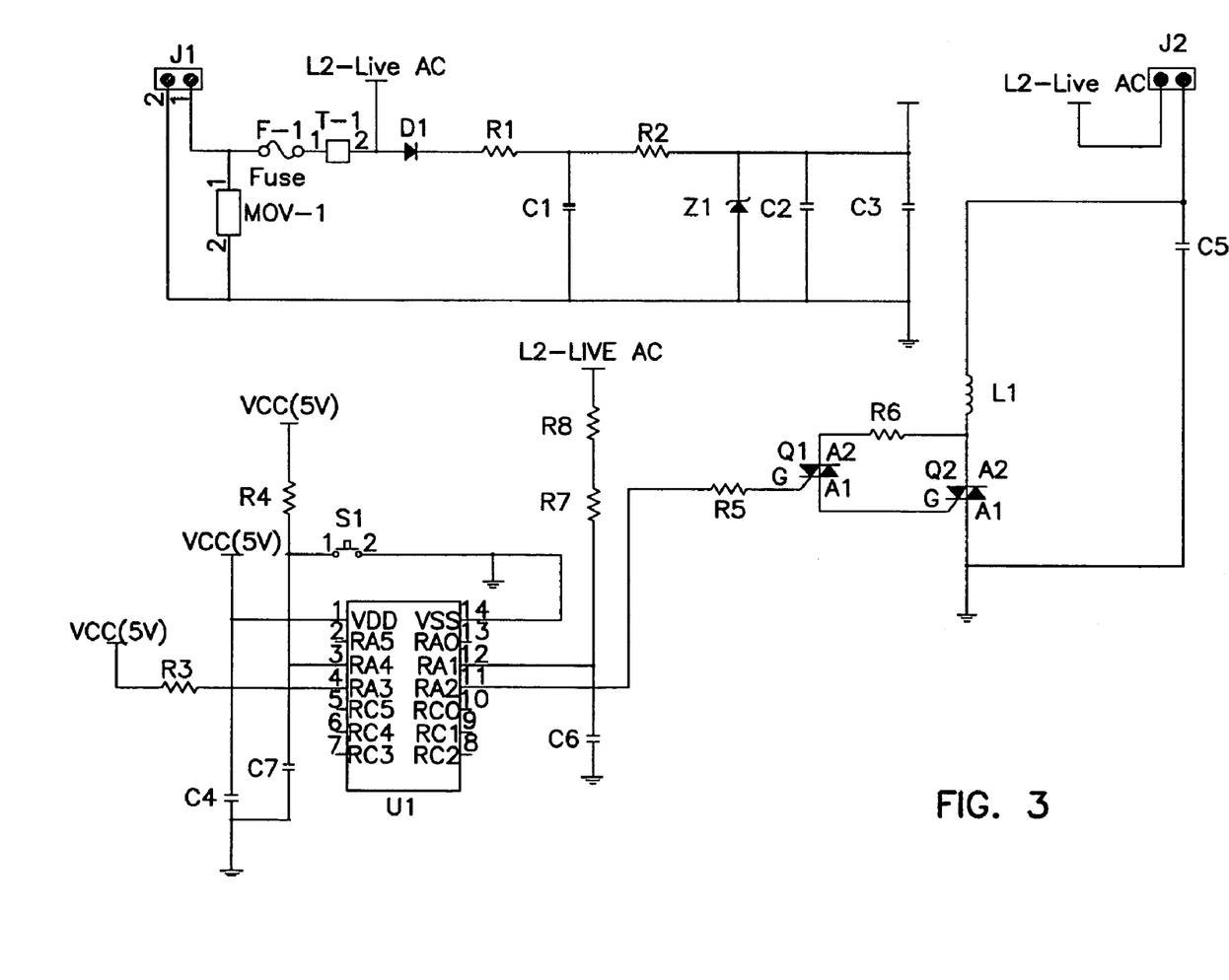
FIG. 3 is a schematic circuit diagram illustrating features of an example control system according to principles of the present invention.

The circuit assembly 26 includes a controller 52, a plurality of filter components 54, a triac 56, and a power converter 58 that is coupled to the power cord 28. FIG. 3 is a schematic diagram representing an example configuration for the circuit assembly 26. The circuit assembly illustrated in FIG. 3 includes a plurality of resistors (R1-8), capacitors (C1-7), inductors (L1-2), a fuse (F1), a controller (U1), a triac (Q1-2), a power converter and other components that provide control of light generated by the lamp. The capacitors and fuse are especially useful for filtering noise from the circuit assembly (e.g., noise in the switch signals generated by the switch assembly 22) that may otherwise inhibit accurate control of power allocation to the bulb of the lamp. The triac Q1, Q2 help control power flow to the light source (via J1, J2 in FIG. 3) based on control signals from the processor U1.

Figure 4:
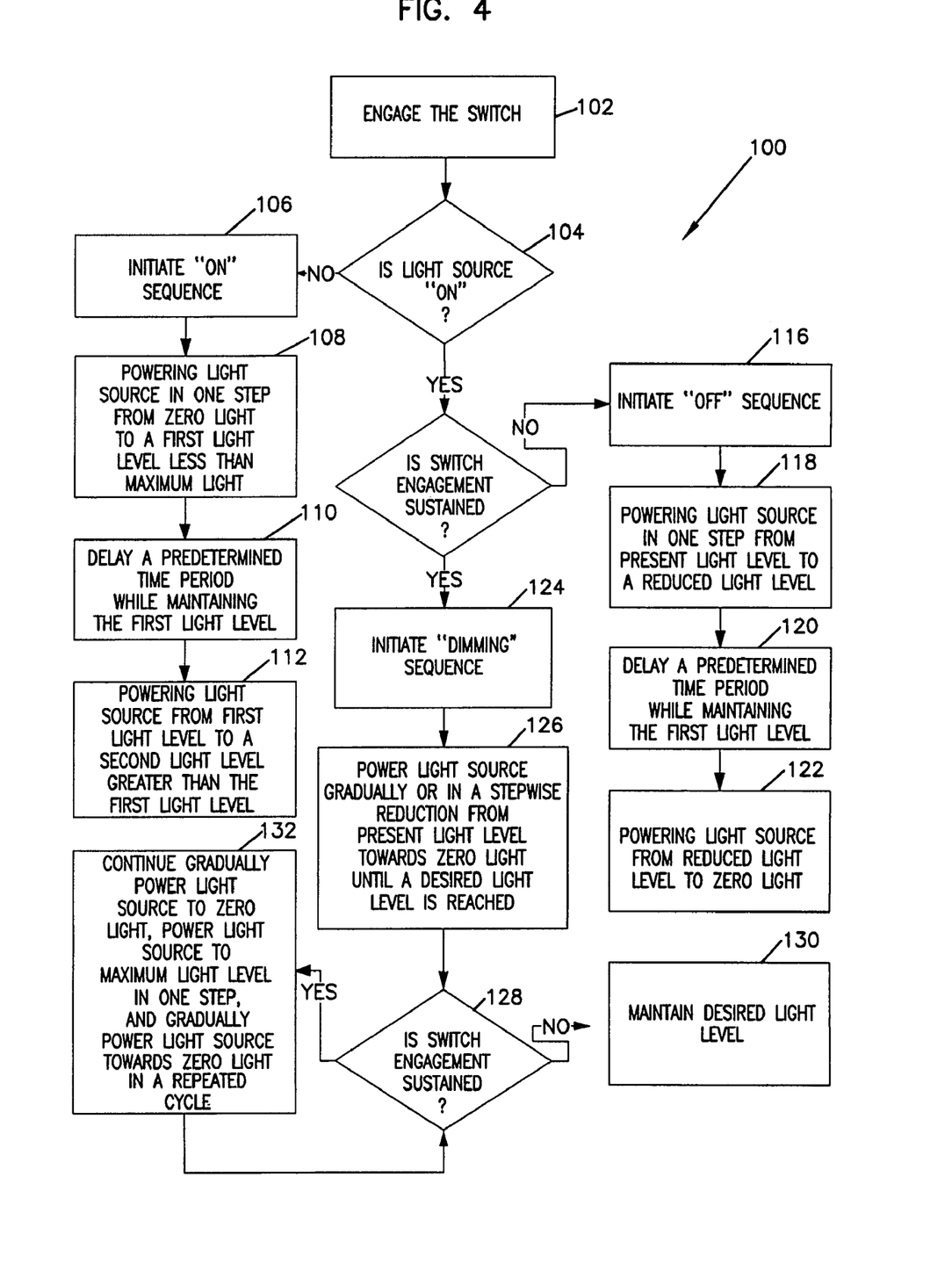
FIG. 4 is a flow diagram illustrating steps of an example method of controlling light output from a lamp.
Figure 5:
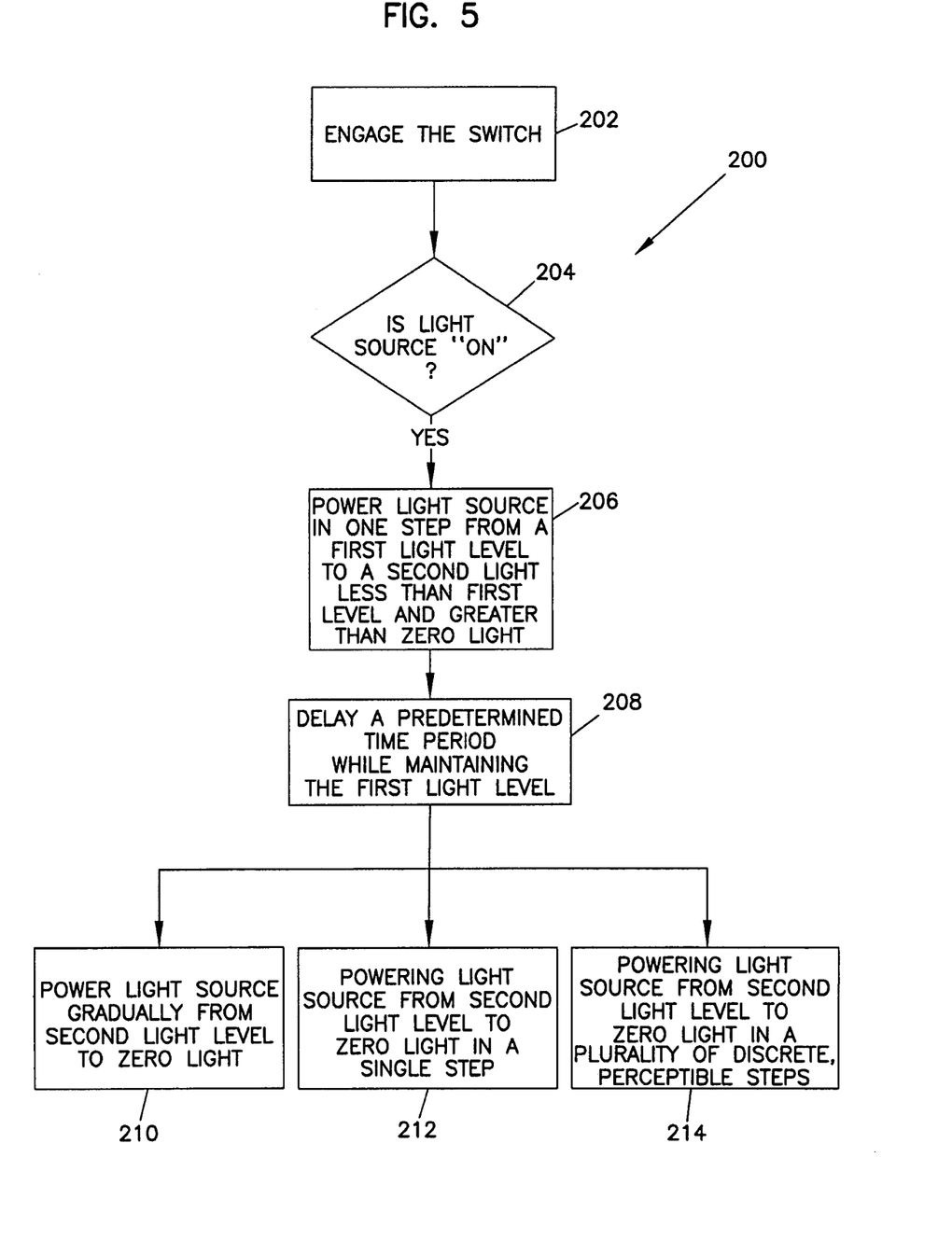
FIG. 5 is a flow diagram illustrating steps of an example OFF sequence.
Figure 6:
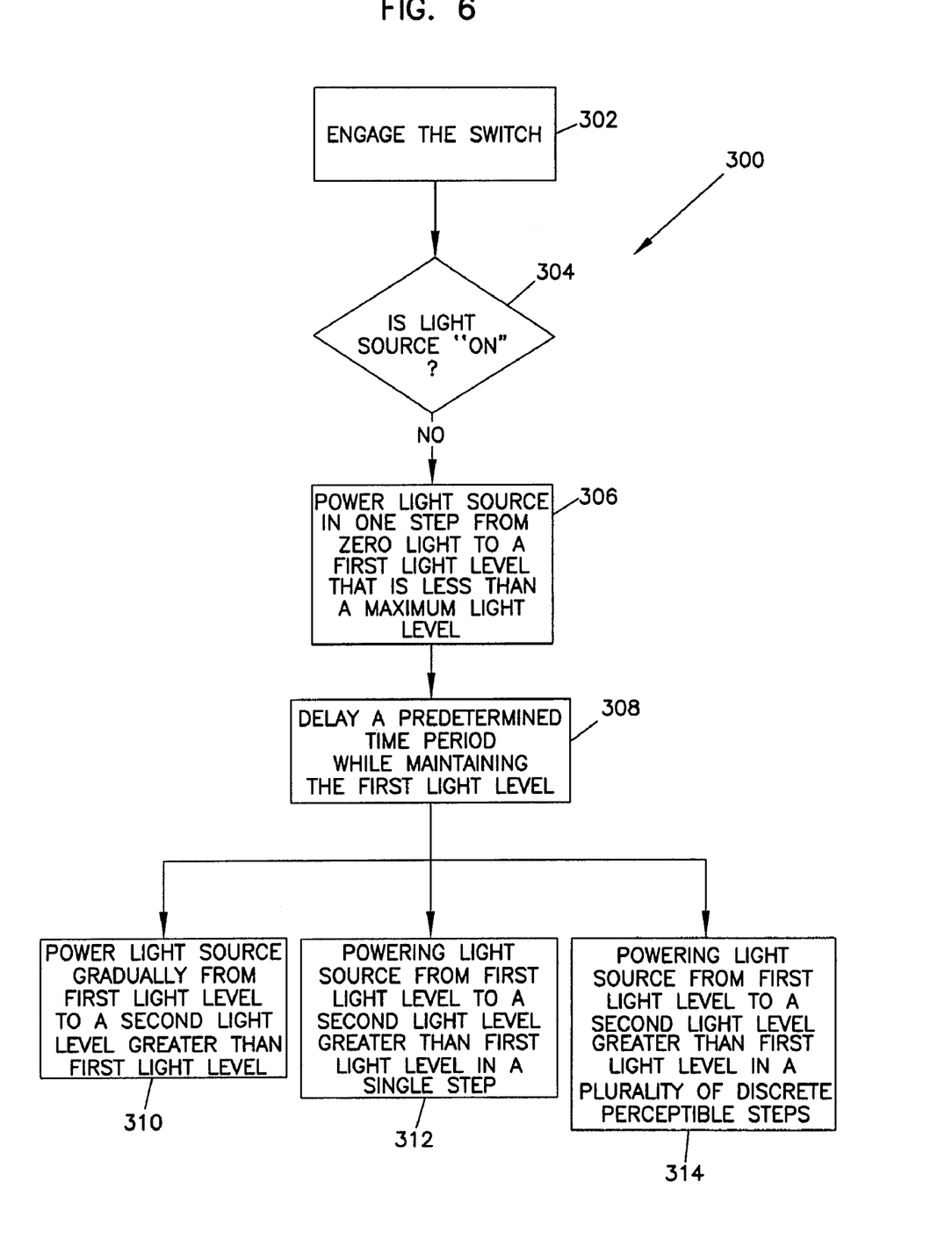
FIG. 6 is a flow diagram illustrating steps of an example ON sequence.

The controller 52 of the circuit assembly 26 has stored thereon a program (e.g., software), which when operated by the controller, provides instruction for operation of the lamp and generation of light specifically. FIGS. 4-6 illustrate some example methods of operation of a lamp resulting from implementation of the program using the controller.

FIG. 4 illustrates various steps of an example method of operating a lamp, which includes an "ON" sequence, and "OFF" sequence, and a "DIMMING" sequence. The method 100 is initiated by engaging the switch in a step 102. Next, there is a determination whether the light source is ON in a step 104. If the light source is not ON, the controller initiates the ON sequence in a step 106 by first powering the light source in one step from zero light to a first light level that is less than a maximum light level in a step 108. Next, there is a delay of a predetermined time period in a step 110, followed by powering the light source from the first light level to a second light level that is greater than the first light level in a step 112. In other embodiments, the ON sequence includes powering the light source in one step from zero light to maximum light without any perceptible intermediate steps or time delays.

If the light source is ON (determined in step 104), there is a determination whether or not the switch engagement is sustained in a step 114. If the switch engagement is not sustained (i.e., reflecting a touch and release of the switch) the OFF sequence is initiated in a step 116. The OFF sequence includes powering the light source in one step from a present light level to a reduced light level in a step 118. Next, a delay of a predetermined time period is sustained in a step 120 followed by powering of the light source from the reduced light level to zero light in a step 122.

If the switch engagement is sustained in a step 114, the DIMMING sequence is initiated in step 124. The DIMMING sequence includes powering the light source from the present light level towards zero light until a desired light level is reached in a step 126. When the desired light level is reached and a determination is made in a step 128 that the switch engagement is not sustained, a further step of maintaining the desired light level occurs in a step 130. If the switch engagement is still sustained in the step 128, a step 132 provides continued powering of the light source to zero light, powering the light source to maximum power in a single step, and powering the light source towards zero light in a repeated cycle until the switch engagement is no longer sustained in step 128.

The step 108 of powering the light source from zero light to a first light level includes illumination of the light source to a level that is perceptible by the user and is less than the maximum light output of the light source. In one example, the first light level is preferably about 20% to about 80% of the maximum light output, more preferably about 50% to about 70% of maximum light output, and most preferably about 60% of the maximum light output. The step 118 of powering the light source from a present light level to a reduced light level may include a similar step change in light, although in a reduced light scenario. For example, the reduced light level may be, in one example, preferably about 40% to about 90% of the present light level, more preferably about 50% to about 80% of the present light level, and most preferably about 60% of the present light level. At a minimum, the reduced light level should provide a perceptible reduction in light output from the light source as compared to whatever the present light level was when the OFF sequence was initiated.

The one step increase to the first light level in step 108 and the one step decrease in light level to the reduced light level in step 118 are advantageous for indicating to the user that the switch has been activated to initiate the ON or OFF sequence. The one step increase prevents an immediate significant amount of light in the case of powering ON the light source (which may result in pain to the user's eyes), and the one step decrease prevents the user from being left in darkness when turning OFF the light source. The use of a delay in step 110 can provide a time period within which the user's eyes can adjust to the illumination provided by the first light level before the automated powering of the light source from the first light level to a second light level. Likewise, the delay of step 120 can provide a time frame within which the user can exit the room within which the lamp resides before light output by the lamp is completely shut OFF in step 122.

The DIMMING sequence initiated at step 124 includes powering the light source gradually from the present light level towards zero light until a desired light level is reached in a step 126. When the desired light level is reached, a step 128 inquires whether the switch engagement is sustained. If the switch engagement is not sustained, which means that the user has stopped activation of the switch, the system maintains the desired light level in a step 130. If the switch engagement is sustained, the controller continues to gradually power the light source to zero light, the light source is then powered to maximum light level in one step, and then the light source is gradually powered toward a zero light in a repeated cycle until it is confirmed that switch engagement is no longer sustained.

The dimming step of powering the light source from a present light level towards zero light in the step 126 may occur in different ways. In one example, the light source may be powered in incremental steps of a size that provide imperceptible changes between individual steps thereby providing a gradual reduction in light. In another embodiment, the incremental steps are sized such that each step is perceptible, for example, representing about 5% to 20% of the present light level. In such a stepwise reduction in light level, a predefined time delay may occur between each step. The predefined delay in time between each step can provide time for the user engaging the switch to determine whether the desired light level has been reached and then disengage the switch in order to maintain that desired light level without accidentally moving past the desired light level before the decision and disengagement occur.

If the desired light level is not determined in a first cycle of reducing light from the present light level to zero light, the step 132 provides for a repeated cycle of moving between zero light, a maximum light level, and zero light again until the user disengages the switch at an appropriate time to maintain a desired light level. While step 132 sets forth a single step increase in light level from zero light to the maximum light level before reducing again gradually towards zero light, other sequences are possible in other embodiments. For example, the light source may be powered gradually or in incremental steps from the maximum light level to zero light and back to the maximum light level gradually or in incremental steps in a repeated cycle. In other examples, different combinations of gradual, single step, and incremental step changes in light level can be used in the DIMMING sequence.

The DIMMING sequence initiated in step 124 may also include an initial one step reduction. Such a one step reduction can match the amount of light reduction in step 118. In one embodiment, the inquiry whether the switch engagement is sustained in step 114 occurs between the steps 118, 120, and the step 124 of initiating the DIMMING sequence occurs in response to a YES response from the step 114. Many other variations of the ON, OFF and DIMMING sequences described in FIG. 4 are possible. For example, the DIMMING sequence may include a reverse dimming sequence that involves increasing the light level from the present light level towards maximum light and then cycling back to zero light.

Referring now to FIG. 5, another example OFF sequence is described in detail. The OFF sequence 200 includes engaging the switch 202 to initiate the sequence. In a step 204, a determination is made whether or not the light source is ON. If the light source is OFF, then a step 206 includes powering the light source in one step from a first light level to a second light level that is less than the first light level. After the second light level has been attained, a delay of time may be initiated before one of the steps 210, 212, 214 occurs. The steps 210, 212, 214 represent some alternative steps for powering the light source from the second light level to zero light. The step 210 provides powering the light source gradually (e.g., in continuous or imperceptible incremental steps) from the second light level to zero light. The step 212 provides powering the light source from the second light level to zero light in a single step. Step 224 provides powering the light source from the second light level to zero light in a plurality of discreet perceptible steps.

The step 206 of powering the second light level represents some percentage decrease from the first light level or may represent a percentage of the first light level as described above relative to step 118. The percentage reduction in light may include a relatively small reduction such as, for example, about 5% to about 10% thereby providing a user with a visual indicator that the switch has been engaged and the OFF sequence has been initiated. In other embodiments, a more significant reduction in light of, for example, about 50% to about 75% of the first light level may occur. Any reduction of light may be possible so long as the second light level is less than the first light level and greater than zero light and provides a change that is perceptible to the user.

The time delay in step 208 may be any desired time delay, such as those time delays described above with reference to steps 110 and 120. For example, the time delay may be about 1 to about 30 seconds, more preferably about 2 to about 20 seconds, and most preferably about 10 seconds. However, the time delay can be set and customized for particular users to provide adequate time for the user to depart the room in which the lamp resides before the light source is powered to zero light. It is possible that the predetermined time period is zero time in some instances depending on, for example, which of the steps 210, 212, 214 are used. For example, if the step 210 or step 214 were used, the predetermined time period may be as short zero time. When using step 212, it may be advantageous to use a predetermined time period in step 208 that is greater than zero time.

The time period defined for implementing steps 210 and 214 can also be optimized and customized for particular applications. For example, the time period for implementing steps 210 and 214 may be about 2 to about 20 second, and more preferably about 5 second. In step 210, the gradual reduction in light from the second light level to zero light may be a linear reduction such as, for example, 1% light reduction in light level every 0.1 seconds. The gradual reduction in light can also be non-linear so as to provide very small amounts of light reduction in the first portion of the time period and significant light reduction toward the end of the time period, or vise versa. Likewise, with the step 214 each of the plurality of discreet perceptible steps may represent different amounts of light reduction and may have different delay times between each step. For example, each of the first few steps from the second light level may be about 10% to about 20% of the second light level with each step being held for 3 to 5 seconds while the remaining steps represent about 5% reductions that are each held for about 1 to 2 seconds.

Referring now to FIG. 7, an example ON sequence 300 is illustrated. The ON sequence begins with engaging the switch in a step 302 and then determining whether the light source is ON in a step 304. If the light source is not ON, the light source is powered in one step from zero light to a first light level that is less than a maximum light level in a step 306. After the first light level has been reached, a delay of a predetermined time period may occur in step 308. Following the delay, a number of options are possible for attaining a second light level that is greater than the first light level such as, for example, steps 310, 312, 314. Step 310 includes powering the light source gradually from the first light level to a second light level, wherein the second light level is greater than the first light level. Step 312 includes powering the light source from the first light level to the second light level, wherein the second light level is greater than the first light level, in a single step. Step 314 provides powering the light source from the first light level to the second light level, wherein the second light level is greater than the first light level, in a plurality of discreet perceptible steps.

As with the gradual light level reduction described above related to step 210, the step 310 of gradually changing from a first light level to a second light level involves changing the light level in imperceptible steps through a smooth transition. This transition may be linear or non-linear relative to the amount of change and the time taken between each step of change. The discreet perceptible steps of change in step 314 can be equal in the amount of change in the time delay between each change or may be unequal as described above relative to the discreet steps in step 214.

The single step change from zero light to the first light level in step 306 may be a single step change or may be a plurality of incremental steps that occur within a very short time period (e.g., less than 1 second). The purpose of the single step or quick change of light in steps 306 and 206 provides notice to the user that the switch has been engaged and that the ON or OFF sequence has begun.

The time delay in step 308 can be any time period between zero time and, for example, 1 or 2 minutes. Preferably, the time delay is between about 0 seconds and about 10 seconds, more preferably about 0 to about 5 seconds, and most preferably about 0 to about 2 seconds.

In other embodiments, the ON sequence may include a single step increase from zero light to maximum light, without any delays or intermediate steps. In other embodiments, the ON sequence may include a gradual, continuous increase from zero light to maximum light level. In still further embodiments, the ON sequence may include a series of small, visually perceptible steps (e.g., each step equal to about 5% of the maximum light level) from zero light to maximum light level.

While the Figures and description of those Figures provided above relate to a floor mounted lamp, the principles of the present invention may be equally applicable to wall mounted or ceiling mounted light fixtures. The above specification provides examples of how certain inventive aspects may be put into practice. It will be appreciated that the inventive aspects can be practiced in other ways than those specifically shown without departing from the spirit and scope of the inventive aspects.

We claim:

1. A method of turning OFF a source of light generated by a lamp, the lamp including a light source, a switch mounted on the lamp, and a controller used to control power supply to the light source, the method comprising:

engaging the switch;

powering the light source in a stepwise reduction from a first light level to a second light level that is less than the first light level an amount discernable by a user; and powering the light source from the second light level to zero light.

2. The method of claim 1, wherein powering the light source from the second light level to zero light includes gradually powering the light source from the second light level to zero light.

3. The method of claim 1, wherein powering the light source from the second light level to zero light includes powering the light source from the second light level to zero light in a single stepwise reduction.

4. The method of claim 1, wherein powering the light source from the second light level to zero light includes powering the light source from the second light level to zero light in at least two stepwise reductions.

5. The method of claim 4, wherein the at least two stepwise reductions each include reduction of light output from the light source at least about 10 percent of the second light level.

6. The method of claim 1, wherein powering the light source from the first light level to the second light level includes reduction of light output from the light source of about 10 to about 60 percent.

7. The method of claim 1, further comprising delaying a predetermined time period between when the light source is powered to the second light level and when powering the light source from the second light level to zero light begins, wherein the second light level is maintained during the delay.

8. The method of claim 7, wherein the predetermined time period is at least 2 seconds.

9. A control circuit for use with a lamp, the control circuit comprising:

a switch mounted to the lamp;

a substrate positioned within the lamp;

a processor mounted to the substrate and configured to generate control signals for control of illumination of the lamp according to a program run by the processor and in response to signals generated by activation of a lamp control switch;

a plurality of filter components mounted to the substrate and configured to filter noise from the control circuit, wherein the plurality of filter components includes at least one fuse, a plurality of resistors, and a plurality of capacitors; and a triac mounted to the substrate and configured to control power flow to the light source in response to controls signals from the processor.

10. The control circuit of claim 9, wherein the triac is a 16 Amp triac, and the plurality of capacitors includes at least 3 capacitors.

11. The control circuit of claim 9, wherein the lamp includes a base, an elongate stand supported at one end by the base, a support arm extending in a direction transverse to the stand at an opposing end of the stand, a light source supported by the support arm, and a switch mounted at an intersection point between the stand and the support arm.

12. A method of operating a lamp, the lamp including a light source, a switch mounted on the lamp, and a processor used to control power supply to the light source, the method comprising:

engaging the switch to turn ON the light source, wherein turning ON the light source includes powering the light source in one step from zero light to a maximum light level; and engaging the switch to turn OPT the light source, wherein turning OFF the light source includes powering the light source in a stepwise reduction from a first light level at or below the maximum light level to a second light level that is less than the first light level and powering the light source over a second predetermined time period from the second light level to zero light.

13. The method of claim 12, further comprising engaging the switch to adjust the light level of the light source after turning ON the light source, wherein adjusting the light level includes gradually powering the light source from the maximum light level towards zero light until the desired light level is reached.

14. The method of claim 13, wherein engaging the switch to adjust the light level includes maintaining a pressure force on the switch until the light level reduces to a desired light level and then releasing the switch to maintain the desired light level.

15. The method of claim 13, wherein when the light level reaches zero light when adjusting the light level, the processor powers the light source to maximum light level in one step and then gradually powers the light source towards zero light.

16. The method of claim 12, wherein the lamp further comprises a tilt switch, and the method further includes activating the tilt switch to turn OFF the light source if the lamp tilts a predetermined angle relative to a vertical orientation.

17. The method of claim 12, wherein the second light level is between about 20% to about 80% of the first light level.

18. The method of claim 12, wherein the second light level is about 60% of the first light level.

19. The method of claim 12, further comprising delaying a predetermined time period between when the second light level is reached and when powering of the light source gradually from the second light level to zero light begins, wherein the second light level is maintained during the delay.

* * * * *

UNITED STATES PATENT AND TRADEMARK OFFICE
CERTIFICATE OF CORRECTION

PATENT NO. : 7,294,977 B1
APPLICATION NO. : 11/331594
DATED : November 13, 2007
INVENTOR(S) : Eusterbrock et al.

Page 1 of 1

It is certified that error appears in the above-identified patent and that said Letters Patent is hereby corrected as shown below:

Col. 9, line 31, claim 12: "to turn OPT the light" should read --to turn OFF the light--

Signed and Sealed this

Fifteenth Day of July, 2008

JON W. DUDAS
*Director of the United States Patent and Trademark Office*